United States Patent [19]

Shaug et al.

[11] Patent Number: 5,912,933
[45] Date of Patent: Jun. 15, 1999

[54] METHOD AND SYSTEM FOR DIRECT EVALUATION OF OPERATING LIMIT MINIMUM CRITICAL POWER RATIOS FOR BOILING WATER REACTORS

[75] Inventors: James C. Shaug, Morgan Hill, Calif.; Charles L. Heck, Wilmington, N.C.; Jens G. M. Andersen, Wilmington, N.C.; Ingmar E. Sterzing, Wilmington, N.C.

[73] Assignee: General Electric Company, Schenectady, N.Y.

[21] Appl. No.: 08/985,061

[22] Filed: Dec. 4, 1997

[51] Int. Cl.[6] ................................................ G21C 17/00
[52] U.S. Cl. .................... 376/216; 376/259; 364/528.21
[58] Field of Search ................................ 376/216, 259, 376/277, 463; 364/528.21, 578; 395/500; 702/182

[56] References Cited

U.S. PATENT DOCUMENTS

| | | | |
|---|---|---|---|
| 4,330,367 | 5/1982 | Musick | 376/245 |
| 5,091,139 | 2/1992 | Chao et al. | 376/216 |
| 5,171,516 | 12/1992 | Iwamoto | 376/216 |

Primary Examiner—Daniel D. Wasil
Attorney, Agent, or Firm—Nixon & Vanderhye P.C.

[57] ABSTRACT

A method and system for thermal-dynamic modeling and performance evaluation of a nuclear Boiling Water Reactor (BWR) core design is presented. A data processing system is used to execute specific program routines that simultaneously simulate the thermal operating characteristics of fuel rods (or plural groups of fuel rods) within the reactor during a transient operational condition. The data processing system is also used for compilation of a transient response histogram that incorporates the effect of inherent "uncertainties" in various parameters of interest. In an initial phase, the method employs a multi-dimensional approach for the simulation of postulated operational events or an anticipated operational occurrence (AOO) which produces a transient condition in the reactor—such as might be caused by single operator error or equipment malfunction. In a following phase, the operating limit minimum critical power ratio (OLMCPR) of the reactor is directly evaluated from a histogram of probability calculations representing the number of fuel rods subject to a boiling transition (NRSBT) during the transient condition. The histogram may be readily displayed by the data processing system and used to statistically demonstrate an OLMCPR compliance of the reactor core design with USNRC regulations.

20 Claims, 4 Drawing Sheets

METHOD AND SYSTEM FOR DIRECT EVALUATION OF OPERATING LIMIT MINIMUM CRITICAL POWER RATIOS FOR BOILING WATER REACTORS

TECHNICAL FIELD

The present invention relates generally to methods for evaluating nuclear power core operation for Boiling Water Reactors, and more particularly to an improved method and apparatus for determining an operating limit minimum critical power ratio (OLMCPR) so as to effectuate increased efficiency and operation of Boiling Water Reactors.

BACKGROUND

In a Boiling Water nuclear Reactor there are basically three modes of heat transfer that must be considered in defining thermal limits for the reactor: (i) Nucleate boiling, (ii) transition boiling and (iii) film boiling. Nucleate boiling is the preferred efficient mode of heat transfer in which the BWR is designed to operate. Transition boiling is manifested by an unstable fuel rod cladding surface temperature which rises suddenly as steam blanketing of the heat transfer surface occurs, then drops to the nucleate boiling temperature as the steam blanket is swept away by the coolant flow, then rises again. At still higher fuel rod/bundle operating powers, film boiling occurs which results in higher fuel rod cladding temperatures. The cladding temperature in film boiling, and possibly the temperature peaks in transition boiling, may reach values which could cause weakening of the rod cladding and accelerated corrosion. Thus, fuel rod overheating is conservatively defined as the onset of the transition from nucleate boiling to film boiling. Accordingly, the conventional basis for reactor core and fuel rod design is defined such that some "margin", accommodating various design and operational "uncertainties", is maintained between the most limiting operating condition and the transition boiling condition at all times for the life of the core.

The onset of transition boiling can be predicted by a correlation to the steam quality at which boiling transition occurs—called the "critical quality". Steam quality can be readily measured and is generally a function of measuring distance above the boiling boundary (boiling length) for any given mass flow rate, power level, pressure and bundle flow geometry among other factors. A "critical power" is defined as that bundle power which would produce the critical quality of steam. Accordingly, a "critical power ratio" (CPR) is then defined as the ratio of the critical power to the bundle operating power at the reactor condition of interest and is descriptive the relationship between normal operating conditions and conditions which produce a boiling transition. Consequently, the CPR is conventionally used as the figure of merit for rating reactor design and operation. To assure a safe and efficient operation of the reactor, the CPR must be kept above a prescribed value for all of fuel assemblies in the core. Consequently, reactor operating limits are conventionally defined in terms of the most limiting fuel assembly in the core—defined as the "minimum critical power ratio" (MCPR). Reactor operating limits are thus often stated in terms of MCPR.

In nuclear power generation engineering, it is widely recognized that there is a possibility, however small, that the occurrence of a reactor transient event combined with the various "uncertainties" and tolerances inherent in reactor design and operation may cause transition boiling to exist locally for some period of time. Accordingly, MCPR operating limits are conventionally set in accordance with the United States Nuclear Regulatory Commission (USNRC) design basis requirement that transients caused by single operator error or single equipment malfunction shall be limited such that, taking into consideration uncertainties in the core operating state, more than 99.9% of the fuel rods are expected to avoid boiling transition. Accordingly, a safety limit minimum critical power ratio (SLMCPR) is defined under current USNRC requirements as the MCPR where no more than 0.1% of the fuel rods are subject to boiling transition.

Notwithstanding the above design basis requirements, developments in fuel design, core loading, and reactor operation over the past years have gradually increased the operating limit minimum critical power ratio (OLMCPR) and reduced the operational "margin" conventionally associated with Boiling Water Reactors (BWRs). Several factors have contributed to the reduction in reactor operational margin. For example, the development of 9-by-9 and 10-by-10 fuel rod bundles having smaller rod diameters has reduced the thermal time constant associated with the fuel rods and made the fuel rods more sensitive to power transients. In addition, the conventional use of a "one-dimensional" power shape model in the mathematical modeling and analysis of the transient response of fuel rods has the effect of further reducing the calculated operating margin. As a result, the OLMCPR has increased to within a range of 1.3 to 1.4—which for most BWRs is typically set from an observance of "fast" pressurization transients (e.g., such as those resulting from a turbine "trip" without bypass). However, contemporary movements toward the use of high energy cores—characterized by power up-rates, long cycles and high capacity factors—necessitates increased critical power ratio (CPR) margins in order to optimize the fuel cycle economy. Moreover, as a result of contemporary optimizations in fuel bundle design, recent increases in operational safety limits translate into a corresponding increase in the operating limit CPR.

Motivated by these and other concerns, the inventors of the present invention were led to examine more closely some of the processes conventionally used in evaluating BWR designs and calculating OLMCPR. As a consequence, it was realized that the conventional processes were laden with excessive conservatism that resulted in inaccurate evaluations of reactor performance and calculation of the OLMCPR. For example, the following is a brief list summarizing five of the somewhat more prominent factors identified by the inventors as contributing to excessive conservatism in conventional BWR performance evaluations:

i. The use of one-dimensional (1-D) instead of three-dimensional (3-D) methods.
   The conventional 1-Dimensional modeling methods used for evaluation of transients fail to incorporate the "flattening" of the shape of the radial power distribution that generally occurs during a transient —thus leading to an over prediction of the transient change in critical power ratio (DCPR).

ii. The inconsistent use of radial power shapes.
   The safety limit is calculated in 3-D using the flattest possible steady state radial power shape in order to maximize the number of rods close to boiling transition. Conventionally, the transient CPR (DCPR) is calculated in 1-D assuming a highly peaked radial power shape in order to drive the bundle to the safety limit. If the same peaked radial power shape that was used for the DCPR evaluation is used for the safety limit, a lower safety limit would result. Conversely, if the same flattened radial power shape used for the safety limit were applied to the transient the DCPR would be reduced. For either situation the OLMCPR would be reduced and operating margin would be increased.

iii. The addition of "uncertainties" instead of a statistical combination.

Values representing uncertainties in the calculations for both safety limit and DCPR are currently added linearly. Since the parameters contributing to these "uncertainties" are statistically independent, a "propagation of error" or equivalent method is a more appropriate approach for combining these values.

iv. A failure to consider direct moderator heating in the correlation for boiling transition.

In an actual fuel bundle, a small fraction of the energy is deposited directly into the fluid. However, in conventional fuel rod modeling for a test bundle, all power is considered as residing entirely in the fuel rods.

v. Overly conservative safety limit parameters.

Smaller values for "uncertainties" than those conventionally used can be justified—resulting in a lower safety limit.

Conventionally, a SLMCPR has been statistically evaluated by using steady state calculations. (See for example, the General Electric publication *General Electric BWR Thermal Analysis Basis (GETAB): Data, Correlation and Design Application,* NEDO-10958-A, January 1977). A statistical evaluation process similar to the one described in this publication was used in the safety evaluation of the licensing topical report for conventional one-dimensional simulation methods, but was only applied to the evaluation of the transient DCPR. (See the General Electric Publication *Qualification of the One-dimensional Core Transient Model for Boiling Water Reactors* (Volume 1), NEDE-24154-A, Class I, August 1988).

Based on the above considerations, the inventors of the present invention realized that due to the excessive degree of conservatism inherent in the conventional basis used for evaluation of BWR operations, a substantial increase in the operating margin for a BWR could be realized by using a less conservative approach toward determining the OLMCPR—as long as such an approach could be demonstrated as mathematically sound. A resultant benefit is that any substantial increase in the permissible operating margin for a reactor translates into increased operating efficiency, greater fuel generation and/or lowered fuel exhaustion. For example, demonstrating that a particular reactor or reactor design actually has a greater operational margin than may have been previously realized—for example, due to the use of an unnecessarily overly conservative evaluation method—could permit operation at increased output power levels or at comparable power output levels using less fuel. Accordingly, a less conservative and more mathematically sound evaluation method that results in a substantially greater operational margin for Boiling Water Reactors is presented herein for calculating and demonstrating the OLMCPR. Moreover, in principle, the improved method and system of the present invention may also be applied toward the statistical determination of operating limits for other reactor parameters important to reactor safety, for example, the limiting linear heat generation rate (LHGR) in a BWR, the critical heat flux limit in a PWR or LMCR, or the maximum fuel temperature, or the maximum fuel cladding temperature limit in any reactor containing fuel enclosed by a metallic material. These other applications would require that the probability distribution be characterized for each parameter of interest either in the form of a histogram or by some other means such as the generation of a response surface.

Briefly, the improved method of the present invention is based on producing a histogram of the number of reactor fuel rods susceptible to operation at "boiling transition" temperatures over a range of variations in selected parametric quantities that are indicative of reactor design constraints and operating conditions. In addition, a core operational modeling approach using multi-dimensional analysis is employed for simulating BWR thermal hydraulics and neutron kinetics during an "anticipated operational occurrence" or AOO in the reactor (for example, a operational occurrence that causes a brief power transient). Basically, in the present invention, all model and reactor plant parameters that may affect the number of rods subject to boiling transition (NRSBT) are first evaluated simultaneously using multi-dimensional modeling of a plurality of fuel rods during a reactor transient condition. The NRSBT is then evaluated statistically in order to determine the OLMCPR directly without the need for first calculating a value for the SLMCPR. Using this approach, the present invention achieves a direct evaluation of OLMCPR of the reactor from a statistical analysis of histograms for the transient condition—as opposed the conventional "indirect" approach of determining an OLMCPR from a combination of values obtained by separately evaluating both a steady state Safety Limit Minimum Critical Power Ratio (SLMCPR) and the change in the critical power ratio (DCPR) due to a transient operational occurrence.

Although the use of statistical processes for the evaluation of the "uncertainties" in the modeling of peak cladding temperature for a loss-of-coolant accident has been previously proposed and published by the United States Nuclear Regulatory Commission (USNRC) (See for example, *Quantifying Reactor Safety Margin, Application of Code Scaling, Applicability, and Uncertainty Evaluation Methodology to a Large Break Loss-of-Coolant Accident,* NUREG/CR-5249, October 1989 and U.S. Nuclear Regulatory Commission, Regulatory Guide 1.157, *Best-Estimate Calculations of Emergency Core Cooling System Performance,* May 1989), these publications do not define how component uncertainties can be ultimately combined nor how the resulting total uncertainties are to be applied. Moreover, none of the above publications describe or suggest a direct statistical evaluation of the NRSBT during the transient.

DISCLOSURE OF THE INVENTION

In one aspect, the present invention is an improved method for determining the operating limit minimum critical power ratio (OLMCPR) of a Boiling Water Reactor (BWR) nuclear core. This improvement results in the realization of greater operating margins for the core which in turn results in more efficient and cost effective core operation and/or configurations. In this regard, the present invention also provides an improved and much more direct approach toward illustrating compliance of a nuclear reactor with USNRC licensing requirements than the overly conservative processes conventionally used for such purposes.

In accordance with another aspect, the present invention is a data processing system including a computer having memory and various I/O or display devices that is specifically programmed for providing simulation of transient operational events in a BWR and for a subsequent compilation and display of one or more response histogram(s) that incorporate all the inherent "uncertainties" associated with reactor plant initial state conditions and other parameter(s) of interest or importance.

Basically, a reactor power transient condition is first simulated and evaluated for numerous fuel rods (or rod bundles) simultaneously using a multi-dimensional modeling technique on a computer. After simulating and evaluating the reactor power transient condition—such as might be caused by single operator error or single equipment malfunction—the expected Number of fuel Rods Subject to Boiling Transition (NRSBT) is determined by calculating and summing probability densities for the CPR values associated with individual fuel rods or fuel rod groups. The probabilities determined for each rod depend on the uncertainty in the critical power correlation and other "uncertainties" which include but are not necessarily limited to uncertainties in reactor plant parameters, initial conditions, power distribution, process data, fuel bundle design, manufacturing, modeling methods, and model inputs. Consequently, such calculations are performed over a sufficient number of different iterations wherein all major modeling and plant state parameters are "perturbed"—for example, using a conventional Monte-Carlo statistical analysis approach—such that an NRSBT distribution histogram is established which statistically incorporates all such uncertainties. This may be performed for any number of selected transient criteria and the resultant histogram(s) is (are) further statistically analyzed and displayed by the data processing system along with relevant selected statistical data. In this manner, compliance or non-compliance of a particular BWR design can be statistically determined and demonstrated for any number of selected transient criteria.

The NRSBT distribution histogram is analyzed using statistical methods to determine the "central tendency" of the distribution. Typically the mean or median is used as a statistic to quantify central tendency. The value of this statistic is defined here as the nominal value. In the discussions that follow, examples will be given where the mean value is chosen as the nominal value although the present invention is not limited to this choice. Use of the median value or the value of some other statistic for central tendency as the nominal value is also contemplated as part of the present invention.

The uncertainty in the nominal value of the statistic that is used to quantify central tendency is expressed in terms of a "confidence interval" for the nominal value. A confidence interval is defined such that there is a specified probability (usually of 50% or greater) that the interval contains the nominal value. For example, a 95% probability that the interval bounds the mean, defines a 95% confidence interval for the mean. The specified probability used to establish this confidence interval is called the "level of confidence" or confidence level.

For the present invention the susceptibility to boiling transition during the transient is quantified statistically as either (1) the probability that a single rod in the core is susceptible to boiling transition or (2) the expected fraction of total rods in the core susceptible to boiling transition. Such a statistical relationship is possible because each individual trial value of NRSBT has been determined by summing the probabilities that individual fuel rods have CPR values less than 1.0 during the transient. The nominal value for each NRSBT distribution can also by the present invention be associated with the distribution of initial rod CPR values for all fuel rods in the core. It is by this process that the present invention can establish the relationship between the minimal initial MCPR value for all fuel rods in the core and the probability and confidence level that the fuel rods will be susceptible to boiling transition during the transient. The minimal initial MCPR value for the core when determined in this way using the probability and confidence level established by the USNRC design basis requirement for the number of rods not susceptible to boiling transition during the AOO transient, is by definition the minimum Operating Limit MCPR required to demonstrate compliance.

Although the improved methods, as described herein below, are preferably implemented using a high speed data processing system capable of processing simulation routines that require highly accurate calculations and multiple reiterations, the present invention is not intended as limited to any one particular type of computer or data processing system. Any generic data processing system having sufficient, speed, storage memory and programmable computational capabilities for implementing statistical data analysis/reduction may be utilized to implement the present invention.

BRIEF DESCRIPTION OF THE DRAWINGS

These, as well as other objects and advantages of this invention, will be more completely understood and appreciated by careful study of the following more detailed description of a presently preferred exemplary embodiment of the invention taken in conjunction with the accompanying drawings, of which.

BEST MODE FOR CARRYING OUT THE INVENTION

In accordance with one aspect, the present invention is a system including a data processing apparatus programmed to execute specific routines for simulating BWR core operating conditions and for calculating and statistically demonstrating the OLMCPR of a reactor in accordance with the improved method of the present invention as described in detail below.

Figure 1:
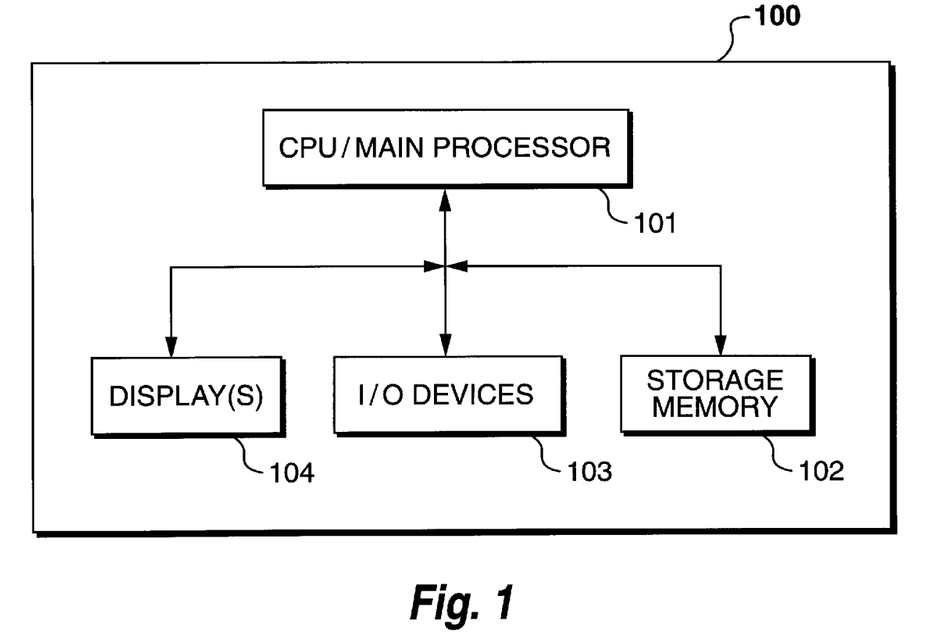
FIG. 1 is block diagram of an example data processing system used for multi-dimensional simulation/modeling of BWR thermal hydraulics and direct evaluation of an OLMCPR for a BWR in accordance with the present invention.

FIG. 1 shows a block diagram of an example data processing system, 100, contemplated for performing the multi-dimensional simulation of reactor core transient response and for the direct evaluation of OLMCPR for a BWR reactor core in accordance with the present invention. Essentially, system 100 includes CPU 101, storage memory 102, and user interfacing I/O devices 103 and optionally one or more displays 104. Storage memory 102 includes a data base (not shown) of reactor plant state information, parameter values and routines for implementing multi-dimensional simulations of core operating conditions and evaluating OLMCPR in accordance with the improved method of the present invention as described herein below.

In another aspect of present invention, a method of more accurately determining the OLMCPR of a BWR and for developing more efficient core designs and reactor operational procedures is provided by performing a direct evaluation of the OLMCPR during the simulation of postulated BWR operational events. In addition, the use of multi-dimensional modeling/simulation of BWR core thermal hydraulics for operational analysis in accordance with the method of the present invention results in a substantial benefit in terms of "margin" improvement in determining the operating limit minimum critical power ratio (OLMCPR). This improved method is described in greater detail below with reference to FIGS. 2 through 4.

Figure 2:
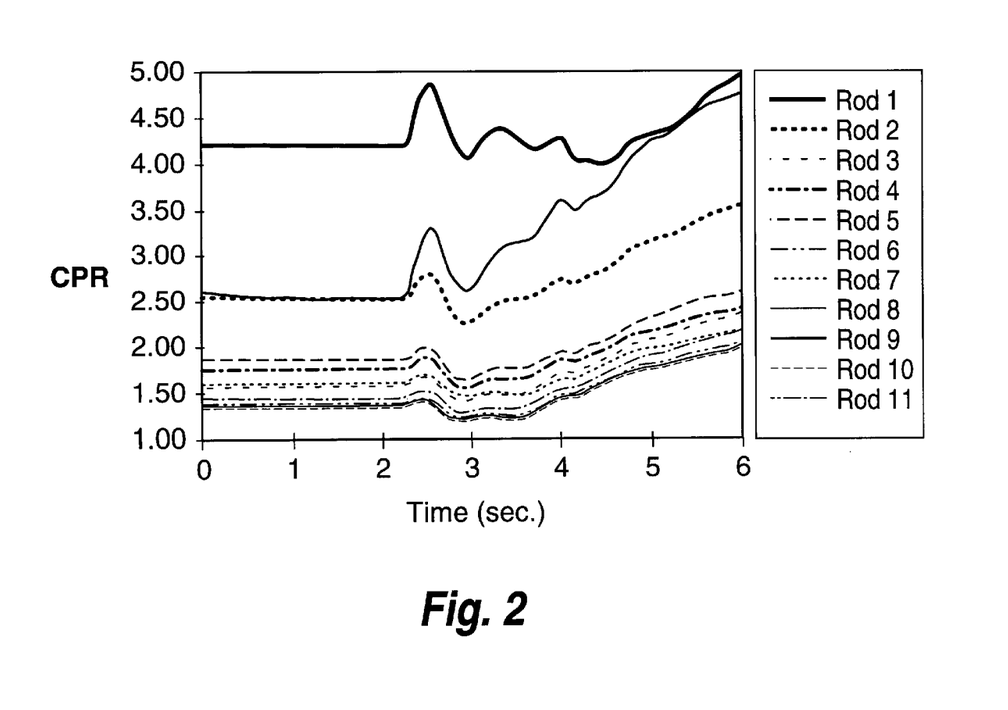
FIG. 2 is a distribution graph of Critical Power Ratios for a plurality of example fuel rods showing the fluctuation in CPR over time during a BWR operational transient situation.

In accordance with the present invention, the critical power ratio (CPR) is first calculated for all rods in all fuel channels in the reactor core using multi-dimensional modeling for the simulation and evaluation of postulated operational events (e.g., AOO transient events or some other anticipated event where the CPR values are expected to change). The multi-dimensional modeling consist of a multi-dimensional calculation of the power distribution and the thermal hydraulic conditions in the reactor core which enable the simultaneous calculation of the CPR for all fuel rods in all fuel channels in the reactor core. For the purposes of simplifying reactor modeling/simulation, fuel rods with similar characteristics may be combined to form a rod group, and fuel channels with similar characteristics may be combined to form a fuel channel group. An example of the effect of a CPR transient for different fuel rod groups or from different channel groups is illustrated in FIG. 2.

Figure 3:
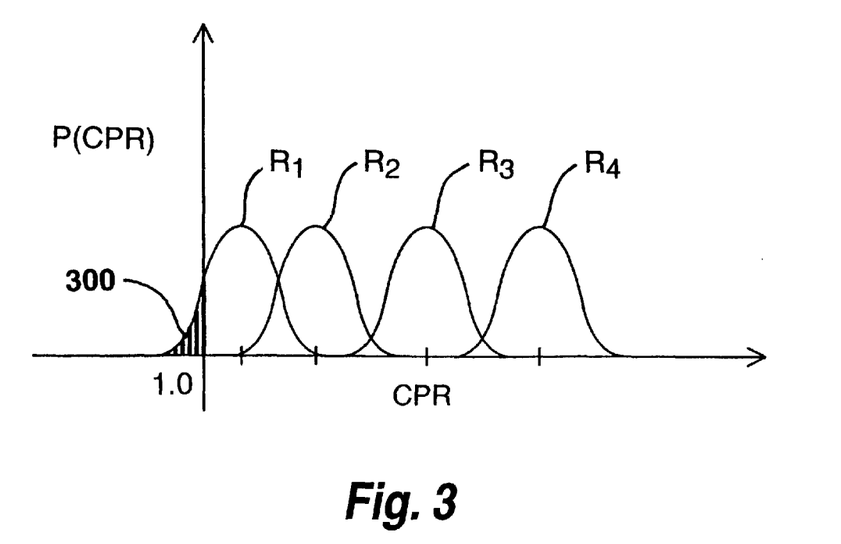
FIG. 3 is a probability distribution graph illustrating examples of the CPR probability distributions for different fuel rods.

In an initial phase, the CPR is determined explicitly for all rods (or rod groups) at all times during a transient. Then upon examining the CPR transient responses for the fuel rods, the minimum nominal value of the critical power ratio (MCPR) is determined for each fuel rod. There are inherent uncertainties associated with these nominal values due to uncertainties in the modeling methods, correlations and inputs and the uncertainty in the reactor plant state. The probability distributions for the calculated MCPR values are not assumed in advance since they are determined by how the CPR calculated values change as a result of changes in the inputs. Typically the resulting probability distributions are expected to approximate a normal distribution due to the random nature of competing effects; however, the present invention is not restricted to situations where the rod MCPR distributions are normal. An example is shown in FIG. 3 where the probability distribution associated with the CPR for a few fuel rods, $R_1$–$R_4$, are illustrated.

For any rod (i), the probability of the rod operating within the range of boiling transition, $P_i$, can be calculated by the integral of the probability distribution function of the rod for CPR values that fall below unity—i.e., the area under the CPR probability distribution function P(CPR) of each rod in FIG. 3 for values of CPR that are less than unity. This is illustrated by shaded area 300 for the P(CPR) curve of rod $R_1$ (which exhibits the lowest CPR of those depicted). By summing over all the probabilities for all rods, the total probable number of fuel rods susceptible to operating in the range of boiling transition can be determined. This summation of probabilities is represented by the following equation:

$$NRSBT = \sum_{i=1}^{\text{All rods}} P_i \qquad \text{EQU. 1}$$

where, $P_i$ is the probability of rod i being in the thermal range of boiling transition; and NRSBT is the probability for the total number of fuel rods subject to operating in the range of boiling transition.

Figure 4:
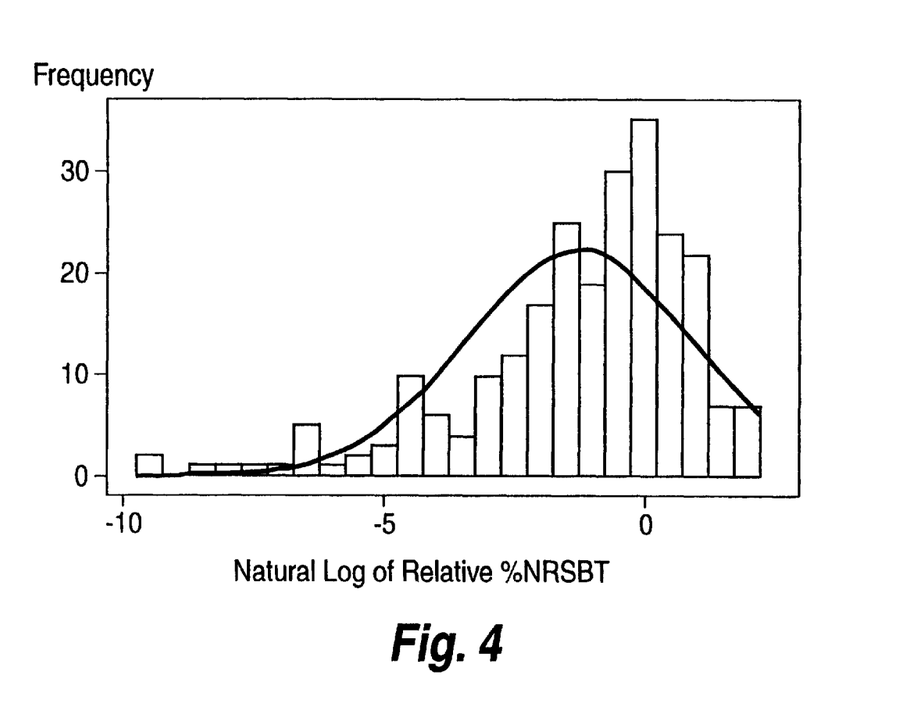
FIG. 4 is an example histogram of the effect of thermal modeling method parameter and reactor plant state parameter perturbation on relative %NRSBT at the limiting point for a transient.

The rod CPR probability distributions P(CPR) in these illustrations are intended to include uncertainties such as those attributed to the CPR correlation, the data used to develop the CPR correlation, and uncertainties in the calculations that implement the correlation. Such uncertainties include uncertainties associated with the particular thermal modeling methods used to evaluate the operational event (such as uncertainties associated with the proposed multi-dimensional modeling approach) and with uncertainties in knowing the exact state of the BWR. Consequently, the sensitivity of NRSBT value to a particular thermal modeling method and/or reactor plant state uncertainties is better evaluated by "perturbing" both plant state and modeling method parameters and then recalculating the resultant NRSBT. After performing a sufficiently large number of such perturbation calculations a NRSBT histogram for the transient is compiled. An example of such an NRSBT histogram is illustrated in FIG. 4.

Next, the number of rods susceptible to boiling transition at a given confidence level is statistically determined from mean and variance values that are obtained and calculated from the NSRBT histogram. The OLMCPR is then determined as the steady state initial minimum critical power ratio for all the fuel rods such that, in the event of a postulated worst case operational event, the calculated number of fuel rods susceptible to boiling transition is less than a predetermined value at a specified confidence level. For example, a contemporary USNRC regulations requirement for licensing of BWRs is the ability to demonstrate (with 50% confidence) that no more than 0.1% of the rods will be susceptible to boiling transition during the limiting AOO transient.

Figure 5A:
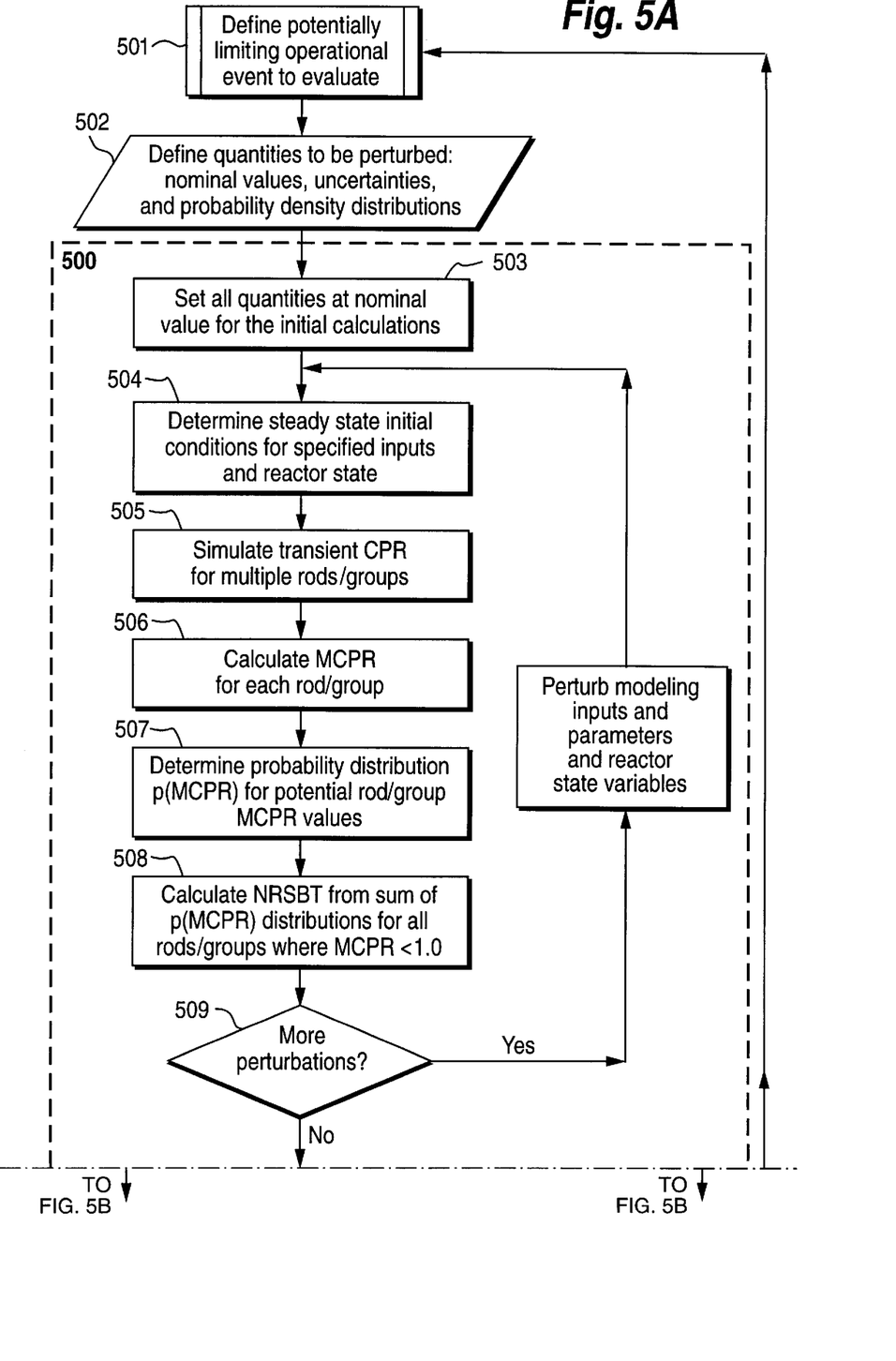
FIGS. 5A and 5B are a flow chart illustrating a sequence of process steps executable by a data processing system for performing a direct evaluation of the OLMCPR for BWR anticipated operational occurrences in accordance with the present invention.
Figure 5B:
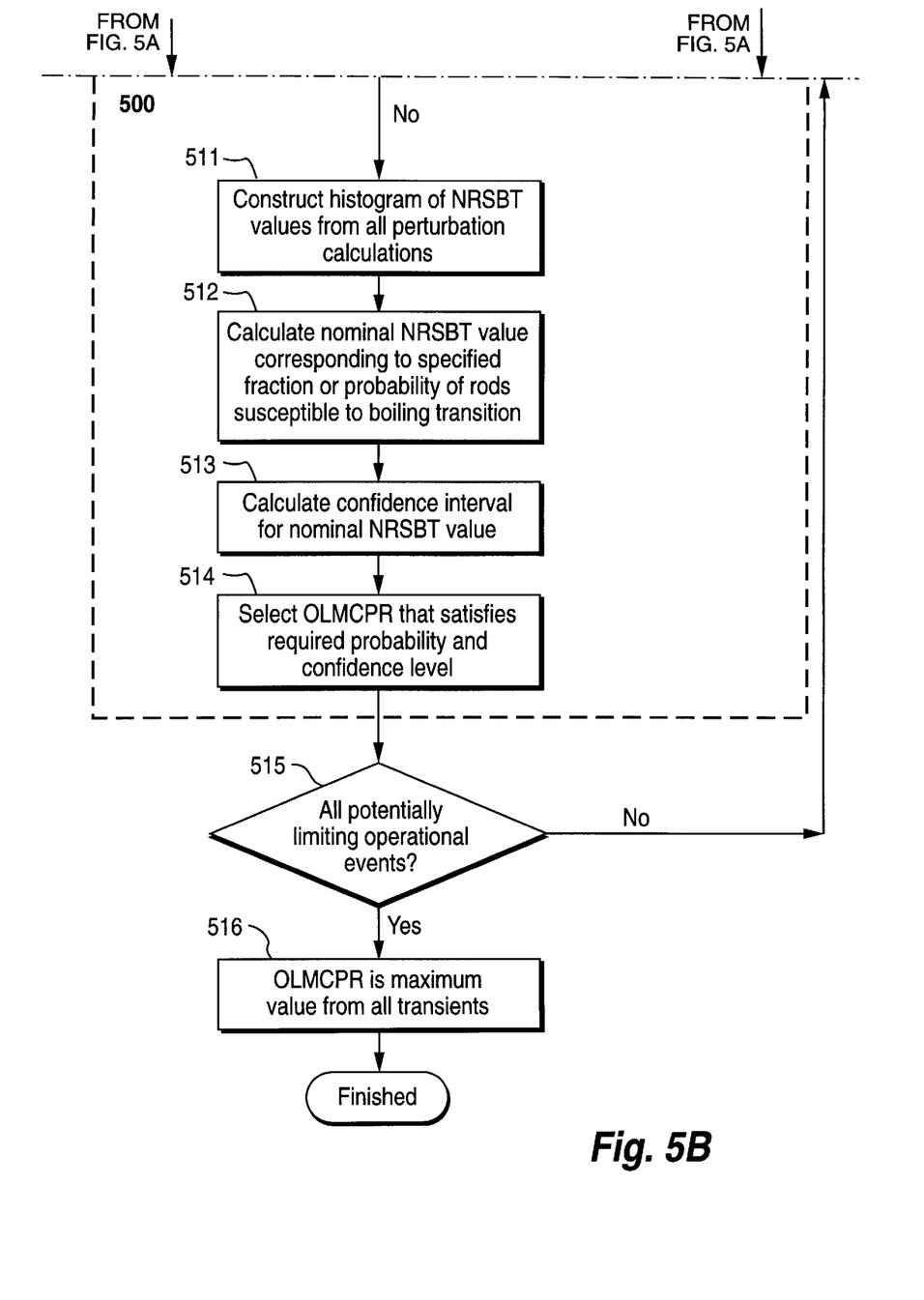

Referring now to FIGS. 5A and 5B, a flow chart is depicted that illustrates the steps of the method of the present invention for determining an operating limit minimum critical power ratio (OLMCPR) so as to effectuate an improved core design. First, a potentially limiting postulated operational event is defined for evaluation (block 501). Next, the particular system "input" quantities that are ultimately to be perturbed are selected and/or defined (block 502). A direct evaluation of the OLMCPR for the postulated operational event in a BWR core is then preferably performed by a data processing system in accordance with the process steps shown within dashed-line box 500.

The presently preferred embodiment for effectuating a direct evaluation of the OLMCPR, contemplated as being executed by data processing system 100, is now discussed in detail with reference to the computer implemented process steps shown within dashed box 500 in FIGS. 5A and 5B. Initially, as indicated at block 503, all (input) quantities are set to nominal values to establish a reference calculation set during a first pass through the iterative part of the process. All other values needed to define the initial conditions for the transient are determined by a multi-dimensional steady-state simulation/calculation that is performed for each set of conditions (block 504). These conditions may be either the nominal reference conditions from step 503 or perturbed conditions from a subsequent iteration (such as established in block 510 described below).

Next, a postulated operational event is simulated using a multi-dimensional model. Individual fuel rods or fuel rod groups from each fuel bundle or fuel bundle group in the core are simulated for the postulated operational event to determine the thermal operating characteristics of the fuel rods during the transient and calculate a profile of the CPR for each fuel rod as a function of time (block 505). CPR data for each rod is then stored, analyzed and the minimum CPR (MCPR) for each rod or group is selected from the transient simulation data (block 506). At this point, a probability distribution taking into account simulation uncertainties is determined using conventional techniques for each MCPR value corresponding to each rod or rod group (block 507).

Next, the probability of the rod operating within the range of boiling transition, $P_i$, is calculated from an integration of the probability distribution function for each rod for MCPR values that fall below unity and a value for the NRSBT is calculated in accordance with Equation (1) by summing CPR probability distributions for all rods where MCPR is less than 1.0 (block 508). Following this step, perturbations are introduced into the input values for the reactor plant initial state and the parameters for multi-dimensional simulation of the core (block 510). The NRSBT is then recalculated (blocks 504 through 508). The steps at blocks 504 through 510 are repeated for a predetermined number of perturbations (block 509) and the NRSBT values and other relevant values for all the transient simulations are recorded.

After all perturbations have been completed a histogram of the recorded NRSBT values is compiled using results from all iterations (block 511). The nominal value for NRSBT is then calculated from the NRSBT histogram using a predetermined statistic measure that quantifies the central tendency of the NRSBT histogram (block 512). Next, a confidence interval for this nominal NRSBT value is calculated (block 513). Finally, the OLMCPR is selected as the minimal initial MCPR value such that the nominal NRSBT value is less than a prescribed cutoff value with a specified level of confidence—corresponding, for example, to the USNRC requisite 0.1% minimum at 50% confidence (block 514). The above processes may then be repeated for all known potentially limiting postulated operational events (block 515) and the OLMCPR ultimately used will be the maximum one of all transients evaluated (block 516). In other words the "limiting" histogram will provide the OLMCPR.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for direct evaluation of an operating limit minimum critical power ratio (OLMCPR) of a boiling water reactor (BWR) using computer simulation(s) of postulated operational events, said reactor described by one or more parametric quantities indicative of design constraints and operating conditions, comprising the steps, executed by a computer, of:

a) initializing said quantities to nominal values;

b) determining steady state initial conditions of reactor operation;

c) simulating an operational event for a plurality of fuel rods in a BWR core;

d) calculating a minimum critical power ratio (MCPR) for each fuel rod simulated in step (c);

e) determining a probability distribution P(MCPR) of potential MCPR values for each MCPR value obtained in step (d);

f) calculating a value for a total number of fuel rods subject to boiling transition (NRSBT) by summing portions of probability distributions corresponding to values for MCPR where MCPR<1.0 for each probability distribution from step (e);

g) perturbing one or more of said parametric quantities and recalculating another value for NRSBT;

h) repeating steps (b) through (g) for a predetermined number of perturbations;

i) developing a histogram of NRSBT values calculated in steps (f) through (g);

j) calculating a nominal NRSBT value, based on a central tendency of an NRSBT distribution, from the histogram of NRSBT values compiled in step (i);

k) calculating a confidence interval for the nominal NRSBT value;

l) selecting an OLMCPR for the reactor as the initial minimal MCPR such that, for a simulation of the most limiting operational event the nominal NRSBT value at a prescribed level of confidence remains less than a predetermined cutoff value; and m) effecting said BWR operation by applying the OLMCPR selected in step (l) as an operational control parameter.

2. The method of claim 1 wherein the operational event is a transient event associated with an Anticipated Operational Occurrence (AOO).

3. The method of claim 1, wherein multi-dimensional modeling of reactor thermal hydraulics and power is used to simulate an anticipated operational occurrence.

4. The method of claim 1, wherein the parametric quantities correspond to reactor plant state values and/or modeling parameters.

5. The method of claim 1, wherein step (c) the anticipated occurrence is simulated for a plurality of fuel rods simultaneously.

6. The method of claim 1, wherein said perturbing of one or more of said parametric quantities is accomplished using a Monte-Carlo statistical analysis approach.

7. A system for determining an operating limit minimum critical power ratio (OLMCPR) of a boiling water reactor (BWR), said system comprising a computer including a storage memory and I/O devices, said memory having stored therein rules for simultaneously simulating and evaluating thermal operating characteristics for a plurality of fuel rods during an anticipated operational occurrence of the reactor and a data base of one or more parametric quantities representing reactor plant operational state values and/or fuel rod modeling parameters, said computer programmed to:

(i) simulate an anticipated operational occurrence for the reactor;

(ii) determine a minimum critical power ratio (MCPR) for each individual fuel rod simulated;

(iii) calculate a probability distribution P(MCPR) of potential MCPR values for each MCPR value;

(iv) calculate a value for a number of fuel rods subject to boiling transition (NRSBT) by summing portions of probability distributions corresponding to values for MCPR where MCPR<1.0 for all rods simulated, then repetitively calculate further values for NRSBT after perturbing one or more of said parametric quantities for a predetermined number of different perturbations;

(v) develop a histogram of calculated NRSBT values over all perturbations; and (vi) select the OLMCPR from a minimal MCPR such that, for a simulation of the most limiting operational event, the nominal NRSBT value at a prescribed level of confidence as determined from analysis of the histogram determined from step (v) remains less than a predetermined cutoff value.

8. The system of claim 7 wherein the operational event simulated is a transient event associated with an Anticipated Operational Occurrences (AOO).

9. The system of claim 7 wherein a multi-dimensional modeling of fuel rod thermal hydraulics and reactor power is used to simulate an anticipated operational occurrence.

10. The system of claim 7 wherein step said anticipated occurrence is simulated for a plurality of fuel rods simultaneously.

11. A computer program product embodied on a computer readable medium for determining an operating limit minimum critical power ratio (OLMCPR) for a Boiling Water Reactor (BWR), comprising:

first instruction sequence means for performing a multi-dimensional simulation of reactor thermal hydraulics and power during an operational event in the reactor; and second instruction sequence means, coupled to said first instruction means, for directly calculating an OLMCPR value based on a statistic evaluation of a minimum critical power ratio (MCPR) for each fuel rod, as obtained from said first instruction sequence means, and for developing a histogram of possible NRSBT (number of fuel rods subject to boiling transition) values calculated from perturbations of predetermined reactor plant state values and fuel rod modeling parameters.

12. The computer program of claim 11 wherein said means for performing a multi-dimensional simulation of reactor thermal hydraulics and power simulates a transient operational occurrence for a plurality of fuel rods simultaneously.

13. A method for evaluating the operating limit minimum critical power ratio (OLMCPR) of a boiling water reactor (BWR), comprising the steps, executed by a computer, of:

a) setting a minimum critical power ratio (MCPR) for each of a plurality of individual nuclear fuel rods used in the reactor;

b) calculating a value for a total number of fuel rods subject to boiling transition (NRSBT);

c) perturbing one or more reactor plant state value and/or fuel rod modeling parameter and recalculating a value for NRSBT;

d) performing step (c) for a predetermined number of perturbations;

e) developing a histogram of NRSBT values determined in steps (b), (c) and (d); and f) selecting the OLMCPR from a minimal MCPR such that, for a simulation of the most limiting operational event, the nominal NRSBT value at a prescribed level of confidence as determined from analysis of the histogram determined from step (v) remains less than a predetermined cutoff value.

14. The method of claim 13 wherein the calculating of an NRSBT value in step (b) is accomplished by the steps of:

determining a probability distribution P(MCPR) to each MCPR value set in step (a), said P(MCPR) indicative of a range of possible MCPR values resulting from various operational and design uncertainties; and integrating the probability distribution for values of MCPR<1.0 for each fuel rod and summing the integration results for all fuel rods.

15. The method of claim 13 wherein the perturbing in step (c) of one or more reactor plant state value(s) and/or modeling parameter(s) is accomplished using randomly generated variations of said values and parameters.

16. For a nuclear fuel core of a Boiling Water Reactor, wherein fuel design and/or core configuration are contingent upon an operating margin for the reactor, said operating margin being determined by a process for evaluating an operating limit minimum critical power ratio (OLMCPR), an improved process for evaluating an OLMCPR and operating a Boiling Water Reactor which results in an improved operating margin for the reactor, comprising the steps of:

a) developing in a memory of a computer system a histogram of NRSBT (number of fuel rods subject to boiling transition) values, corresponding to a plurality of computer simulations of a transient operational occurrence in a reactor, said simulations providing values for a critical power ratio (CPR) for one or more fuel rods for a multiple of different parametric quantities for said reactor;

b) selecting a nominal NRSBT value, based on a central tendency of NRSBT distribution, statistically determined by said computer system from the histogram of NRSBT values developed in step (a);

c) selecting a confidence interval for the nominal NRSBT value;

d) selecting an OLMCPR value from a minimal CPR such that during a simulation of a limiting transient operational occurrence the nominal NRSBT value remains less than a predetermined cutoff value; and e) effecting said Boiling Water Reactor operation by applying the OLMCPR selected in step (d) as an operational control parameter.

17. The method claim 16 wherein said histogram is developed on a data processing system using multi-dimensional modeling of transient operational occurrences, said data processing system including memory to store CPR data obtained from said simulations.

18. For a nuclear fuel core of a Boiling Water Reactor, wherein fuel rod design and/or core configuration are contingent upon an operating margin for the reactor, said operating margin being determined by a process for evaluating an operating limit minimum critical power ratio (OLMCPR), a improved process for evaluating an OLMCPR and operating a Boiling Water Reactor that results in an increased operating margin for the reactor, comprising the steps, executed by a computer, of:

a) developing in a memory of said computer a histogram of NRSBT (number of fuel rods subject to boiling transition) values, corresponding to a plurality of computer simulations of a transient operational occurrence in a reactor, said simulations providing values for a critical power ratio (CPR) for one or more fuel rods for a multiple of different parametric quantities for said reactor;

b) calculating a nominal NRSBT value, based on a central tendency of an NRSBT distribution, from the histogram of NRSBT values obtained in step (a);

c) selecting a confidence interval for the nominal NRSBT value;

d) selecting an OLMCPR for the reactor as the initial minimal MCPR such that during a simulation of a transient the nominal NRSBT value remains less than a predetermined cutoff value; and e) effecting Boiling Water Reactor operation by applying the OLMCPR selected in step (d) as an operational control parameter.

19. A method for statistically demonstrating an operating limit minimum critical power ratio (OLMCPR) of a boiling water reactor (BWR) for compliance with licensing requirements, said reactor characterized by one or more parametric quantities indicative of design constraints and operating conditions, comprising the steps of:

a) programming a computer to determine an OLMCPR value for a boiling water reactor, said computer programmed at least to:

i) develop a histogram of NRSBT (number of fuel rods subject to boiling transition) values, corresponding to a plurality of simulations of a transient operational occurrence in a reactor, said simulations providing values for a critical power ratio (CPR) for one or more fuel rods over a multiple of randomly selected variations in the parametric quantities for said reactor;

ii) calculate a nominal NRSBT value from the histogram of NRSBT values; and iii) select an OLMCPR for the reactor corresponding to a minimal MCPR such that during a simulation of a transient the nominal NRSBT value remains less than a predetermined cutoff value; and b) providing said OLMPCR value to an output device for display, recordation or storage.

20. For use in controlling a Boiling Water Reactor having a nuclear fueled core characterized by an operating limit minimum critical power ratio (OLMCPR) value, a method for determining said OLMCPR value comprising the steps of:

a) using a computer to simulate transient operational occurrences which might occur during the operation of a Boiling Water Reactor;

developing a histogram of NRSBT values from a computer simulation of a transient operational occurrence in a Boiling Water Reactor, the simulation providing values for a critical power ratio (CPR) for one or more fuel rods;

c) determining a nominal NRSBT value, based on a central tendency of an NRSBT distribution, from the histogram of NRSBT values obtained in step (a);

d) selecting a confidence interval for the nominal NRSBT value; and e) selecting an OLMCPR for the reactor as the initial minimal MCPR such that during a simulation of a transient the nominal NRSBT value remains less than a predetermined cutoff value.

* * * * *